US012607503B2

(12) United States Patent
Van Der Avoird et al.

(10) Patent No.: US 12,607,503 B2
(45) Date of Patent: Apr. 21, 2026

(54) DYNAMIC RANGE EXTENSION OF SPAD-BASED DEVICES

(71) Applicant: ams International AG, Jona (CH)

(72) Inventors: André Van Der Avoird, AE Eindhoven (NL); Bobby Daniel, JJ Eindhoven (NL); Erik Jan Lous, KE Veldhoven (NL); Jagruth Prasanna Kumar, AK Geldrop (NL)

(73) Assignee: AMS INTERNATIONAL AG, Jona (CH)

( * ) Notice: Subject to any disclaimer, the term of this patent is extended or adjusted under 35 U.S.C. 154(b) by 318 days.

(21) Appl. No.: 18/043,084

(22) PCT Filed: Aug. 26, 2021

(86) PCT No.: PCT/EP2021/073688
§ 371 (c)(1),
(2) Date: Feb. 27, 2023

(87) PCT Pub. No.: WO2022/043473
PCT Pub. Date: Mar. 3, 2022

(65) Prior Publication Data
US 2023/0324220 A1      Oct. 12, 2023

(30) Foreign Application Priority Data
Aug. 28, 2020     (GB) ...................................... 2013579

(51) Int. Cl.
*G01J 1/44*          (2006.01)
(52) U.S. Cl.
CPC ........... *G01J 1/44* (2013.01); *G01J 2001/442* (2013.01); *G01J 2001/444* (2013.01); *G01J 2001/4466* (2013.01); *G01J 2001/448* (2013.01)

(58) Field of Classification Search
CPC .. G01J 1/44; G01J 2001/442; G01J 2001/444; G01J 2001/4466;
(Continued)

(56) References Cited

U.S. PATENT DOCUMENTS 7,547,872 B2 *  6/2009  Niclass ................ H04N 25/773
                                                  250/214 R
8,692,176 B2 *  4/2014  Kelly ............... G11B 20/00086
                                                  341/155
(Continued)

FOREIGN PATENT DOCUMENTS

CN          106165399 A     11/2016
JP          2017-520134 A    7/2017
(Continued)

OTHER PUBLICATIONS

Ouh et al. "Dual-mode, in-pixel linear and single-photon avalanche diode readout for low-light dynamic range extension in photodetector arrays", IEEE Custom Integrated Circuits Conference (CICC) (2018, pp. 1-4).*
(Continued)

*Primary Examiner* — Mohamed K Amara
(74) *Attorney, Agent, or Firm* — MH2 Technology Law Group LLP

(57)          ABSTRACT

A radiation-sensitive device is disclosed. The device comprises a plurality of single photon avalanche diodes (SPADs) and circuitry configured to adapt a read-out rate of the plurality of SPADs in relation to an intensity of incident radiation. Also disclosed is an associated method of increasing a dynamic range of a radiation-sensitive device comprising a plurality of SPADs. The method comprises adapting a read-out rate of the plurality of SPADs in relation to an intensity of incident radiation.

15 Claims, 3 Drawing Sheets

(58) Field of Classification Search

CPC .............. G01J 2001/448; G01J 3/4406; G01J 2001/446; G01S 7/4863; G01S 7/4873

See application file for complete search history.

(56) References Cited

U.S. PATENT DOCUMENTS

| | | | | |
|---|---|---|---|---|
| 10,921,240 | B1* | 2/2021 | Yan ........................ | H10F 71/139 |
| 11,391,626 | B2* | 7/2022 | Thurston ................... | G01J 1/44 |
| 11,606,517 | B1* | 3/2023 | Sharma ................. | G01S 17/931 |
| 11,675,076 | B2* | 6/2023 | Zheng ................... | G01S 7/4814 |
| | | | | 356/5.01 |
| 11,681,022 | B2* | 6/2023 | Onal ......................... | G01J 1/44 |
| | | | | 356/5.03 |
| 11,733,092 | B2* | 8/2023 | Pacala ................... | H10F 77/413 |
| | | | | 356/4.01 |
| 11,774,556 | B2* | 10/2023 | Onal ....................... | G01S 17/08 |
| | | | | 356/5.01 |
| 11,965,970 | B2* | 4/2024 | Nishino ................. | G01S 17/894 |
| 11,978,754 | B2* | 5/2024 | Finkelstein ........... | H10F 30/225 |
| 11,988,777 | B2* | 5/2024 | Wang ..................... | G04F 10/005 |
| 12,021,100 | B2* | 6/2024 | Iwashina ............. | H10F 39/8057 |
| 12,149,840 | B2* | 11/2024 | Nakagawa .............. | G06T 7/521 |
| 12,345,819 | B2* | 7/2025 | Hiyama ................... | G01S 7/497 |
| 12,366,641 | B2* | 7/2025 | Mahara ................. | G01S 7/4876 |
| 2012/0075615 | A1* | 3/2012 | Niclass ................. | G01S 7/4816 |
| | | | | 356/5.01 |
| 2015/0285625 | A1 | 10/2015 | Deane | |
| 2016/0344965 | A1* | 11/2016 | Grauer ................ | H10F 39/1865 |
| 2017/0139041 | A1 | 5/2017 | Drader et al. | |
| 2018/0003807 | A1* | 1/2018 | Galera ................. | G01S 7/4863 |
| 2018/0031420 | A1* | 2/2018 | Dyba ......................... | G01J 1/42 |
| 2018/0081061 | A1* | 3/2018 | Mandai ................. | G01S 7/4868 |
| 2018/0231646 | A1* | 8/2018 | Schrey ................. | G01S 7/4876 |
| 2018/0259625 | A1* | 9/2018 | Gnecchi ................ | G01S 7/4873 |
| 2018/0301872 | A1* | 10/2018 | Burroughs .......... | H01S 5/18369 |
| 2018/0341009 | A1* | 11/2018 | Niclass ................. | G01S 7/4817 |
| 2019/0239753 | A1* | 8/2019 | Wentz ................... | G01J 3/2803 |
| 2019/0250257 | A1* | 8/2019 | Finkelstein .......... | H04N 25/773 |
| 2019/0331776 | A1* | 10/2019 | Aotake ................... | G01S 7/497 |
| 2020/0158836 | A1* | 5/2020 | Henderson ........... | G01S 17/894 |
| 2020/0217965 | A1 | 7/2020 | Calder et al. | |
| 2020/0240837 | A1 | 7/2020 | Ota | |
| 2020/0284883 | A1* | 9/2020 | Ferreira ............... | G01S 7/4815 |
| 2020/0379133 | A1 | 12/2020 | Burr et al. | |
| 2021/0349192 | A1* | 11/2021 | Wang ................... | G01S 17/931 |
| 2023/0071929 | A1 | 3/2023 | Mochizuki | |
| 2023/0149097 | A1* | 5/2023 | Wentz ................. | A61B 17/221 |
| | | | | 600/424 |
| 2023/0332948 | A1* | 10/2023 | Van Der Avoird ....... | G01J 1/44 |

FOREIGN PATENT DOCUMENTS

| | | |
|---|---|---|
| JP | 2020-197523 A | 12/2020 |
| JP | 2021-129265 A | 9/2021 |

OTHER PUBLICATIONS

GB Search Report dated Feb. 24, 2021, GB Application No. 2013579.4, 3 pages.

International Search Report and Written Opinion dated Dec. 23, 2021, PCT Application No. PCT/EP2021/073688, 14 pages.

Gyongy et al., Advances in CMOS SPAD sensors for LIDAR applications, Proc. of SPIE, vol. 10799, pp. 1079907-1-1079907-9.

Notice of Reason for Rejection issued in Japanese Patent Application No. 2023-513747 dated Oct. 10, 2023, 11 pages.

Chinese Office Action issued in corresponding Chinese Patent Application No. 202180050427.0 dated Jun. 23, 2025, with English language translation, 18 pages.

* cited by examiner

DYNAMIC RANGE EXTENSION OF SPAD-BASED DEVICES

CROSS-REFERENCE TO RELATED APPLICATIONS

The present application is the national stage entry of International Patent Application No. PCT/EP2021/073688, filed on Aug. 26, 2021, and published as WO 2022/043473 A1 on Mar. 3, 2022, which claims the benefit of priority of Great Britain Patent Application No. 2013579.4, filed on Aug. 28, 2020, the disclosures of all of which are incorporated by reference herein in their entireties.

TECHNICAL FIELD

The present disclosure is in the field of SPAD-based devices for use in measurements requiring a large dynamic range, such as point of care testing or electronic-nose applications, and ambient radiation sensing.

BACKGROUND

Detection of radiation emission with a large Dynamic Range (DR) is required in the field of luminescence and fluorescence radiation sensors. Such sensors may, for example, be used in Point of Care (PoC) testing or Electronic-Nose (E-nose) type of applications, or ambient radiation sensor applications.

In the PoC applications, the presence of biological or chemical substances in fluids or air may be detected by their interaction with complementary substances, which may result in chemi-luminescent or fluorescent radiation emission. The levels of the radiation emitted may dynamically vary between extremely low and high levels. To enable a complete signal capture, a radiation sensor suitable for use in such an application must exhibit a very high dynamic range.

Single Photon Avalanche Diode (SPAD) based photon counters offer the ability to detect very low levels of radiation by counting individual photons. The lowest level of detectable signal may be limited by noise due to a dark-count-rate (DCR). The highest level of detectable signal may be limited by the speed of the SPAD diode itself, by a capacity of a counter associated with the SPAD, and/or by capabilities of associated circuitry. In some applications, this may limit a dynamic range of a SPAD-based sensor.

Some sensor implementations may comprise a large amount of SPADs in order to improve a signal-to-noise ratio at low radiation levels. However, such a large amount of SPADs may result in an increase in associated circuitry, potentially further limiting an achievable dynamic range.

In other prior art sensor implementations, different SPAD areas may be used within a single device in combination with one or more pinholes, in order to adjust a radiation intensity incident upon the different SPAD areas. For example, stacked pin holes with shifted apertures in a black medium may be implemented to reduce an intensity of incident radiation. Sensors implementing such solutions may be large, may require additional components, and may exhibit a relatively poor signal-to-noise ratio.

It is therefore desirable to provide a radiation sensor having a large dynamic range suitable for PoC testing or E-nose applications, without compromising on signal-to-noise ratio, or requiring additional components or requiring a substantial increase in device size.

It is therefore an aim of at least one embodiment of at least one aspect of the present disclosure to obviate or at least mitigate at least one of the above identified shortcomings of the prior art.

SUMMARY

The present disclosure is in the field of SPAD-based devices, and in particular relates to SPAD-based devices with large dynamic ranges suitable for use in Point of Care testing, Electronic-Nose applications, and ambient radiation sensing applications.

According to a first aspect of the disclosure, there is provided a radiation-sensitive device comprising a plurality of single photon avalanche diodes (SPADs) and circuitry configured to adapt a read-out rate of the plurality of SPADs in relation to an intensity of incident radiation.

Advantageously, by adapting a read-out rate, an amount of time a given SPAD has available to detect a photon strike may be adapted accordingly. Since each SPAD may only record a single photon-strike event between each read-out cycle, having for example a relatively long read-out time during a period of relatively high intensity incident radiation may result in a substantial amount of the plurality of SPADs not recording photon-strikes events, limiting a radiation intensity that can be measured. By adapting the read-out rate in relation to the intensity of the incident radiation, an amount of SPADs that are not recording photon-strikes events may be minimised, and hence a dynamic range of the radiation-sensitive device may be increased, while maintaining an adequate signal-to-noise ratio.

The circuitry may be configured to increase the read-out rate in response to the intensity of incident radiation exceeding a threshold. The circuitry may be configured to decrease the read-out rate in response to the intensity of incident radiation intensity at or below the threshold.

Advantageously, a threshold, e.g. a predetermined threshold, may define a read out rate that is required to ensure a sufficient signal-to-noise ratio is maintained, while also providing an increased dynamic range of the radiation-sensitive device. For example, by adapting a read-out rate, a limit of the intensity of radiation that can be measured is adapted accordingly. By varying the read-out rate, an amount of SPADs of the plurality of SPADs that can be read-out within a given read-out period may also be varied. Beneficially, defining a threshold may enable a trade-off between an amount of available SPADs and a read-out rate, thus effectively trading off an achievable signal-to-noise ratio for dynamic range. It has been recognised that, at high levels of intensity of incident radiation, there is sufficient signal-to-noise ratio that a smaller number of SPADs may suffice, thus allowing for a higher read-out rate and thereby a larger dynamic range.

The threshold may be programmable.

Advantageously, the threshold may be defined by a user-programmable field, thus enabling a programmable trade-off between dynamic range and achievable signal-to-noise ratio. For example, the device may have one or more programmable registers for defining one or more thresholds.

In some embodiments, a plurality of thresholds may be defined. For example, as an intensity of incident radiation increases from below a first threshold to above the first threshold, the read-out rate of at least some of the plurality of SPADs may be increased from a first rate to a second, higher rate. If the intensity of incident radiation further increases from below a second threshold to above the second threshold, the read-out rate of at least some of the plurality of SPADs may be further increased from the second rate to a higher third rate. It will be appreciated that, if the intensity of incident radiation decreases such that a threshold value is crossed, e.g. the second or first threshold, then the read-out rate of at least some of the plurality of SPADs would be decreased accordingly.

The intensity of incident radiation may be determined by one or more cycles of reading-out at least a portion of the plurality of SPADs.

Advantageously, a determination of an intensity of the incident radiation may be used to determine a read-out rate, and hence an amount of SPADs that may be read out, for a subsequent determination of the intensity of the incident radiation.

The circuitry may be configured to adapt an amount of SPADs of the plurality of SPADs that are read-out in relation to the intensity of incident radiation.

Advantageously, a minimum amount of SPADs required to meet a required signal-to-noise ratio may be read-out. By minimising an amount of SPADs that are read-out, an overall read-out rate may be maximised. That is, for a radiation-sensitive device comprising a number of SPADs, "$Num_{SPAD}$", and wherein a time required to read-out and reset a latch associated with each SPAD is "$T_{1\_SPAD}$", a total readout time of the plurality of SPADs is $Num_{SPAD} \times T_{1\_SPAD}$. Each SPAD can only record one event between each readout cycle. Therefore, a maximum number of photons that can be read per second per SPAD is limited to $1/(Num_{SPAD} \times T_{1\_SPAD})$, minus any dark count rate contribution. Once the intensity of incident radiation increases such that more than one photon arrives per SPAD in the read-out cycle, recording of photon-strike events may be missed. By minimising the number of SPADs required, the total read-out time may be reduced, and hence a rate at which any individual SPAD may be read-out can be increased, thus minimising an amount of photon strikes that are missed.

A low amount of SPADs may be read-out to determine the intensity of the incident radiation when the intensity is high. A relatively high amount of SPADs may be read-out to determine the intensity of the incident radiation when the intensity is relatively low.

Advantageously, a relatively high amount of SPADs may not be required to achieve a desired signal-to-noise ratio at high levels of intensity of incident radiation, and hence a relatively low amount of SPADs may be used to increase on overall read-out rate of the SPADs. The same principle applies at relatively low levels of intensity of incident radiation, wherein a relatively large amount of SPADs may be required to achieve the desired signal-to-noise ratio, and hence a greater amount of SPADs may be used, thereby decreasing on overall read-out rate of the SPADs.

Each SPAD of the plurality of SPADs may have an associated single-bit counter for registering photon strikes.

Advantageously, an overall size of the radiation-sensitive device may be minimised by associating only a single-bit counter with each SPAD. An alternative architecture which may employ multi-bit counters per SPAD to minimise the likelihood of missed photon-strike events may incur costs associated with larger overall device area.

It will be understood that a single-bit counter may be a latch, or switch. That is, in some embodiments the single-bit counter may be one or more circuit components configured to record an event, e.g. latch a signal. Such a single-bit counter may be cleared, e.g. reset, at a rate defined by the read-out rate of the SPADs.

Furthermore, the term "read-out" will be understood to correspond to a process of determining whether the single-bit counter is set, e.g. the latch has latched a photon-strike event. For example, reading-out an array of SPADs would comprise circuitry determining which of the single-bit counters associated with the SPADs have counted, e.g. latched, a photon strike event.

The read-out rate may be dependent upon an amount of SPADs that are to be read-out.

As described above, a readout rate may be defined at $1/(Num_{SPAD} \times T_{1\_SPAD})$. Thereby, a reduction in the amount of SPADs, e.g. decreasing $Num_{SPAD}$ would increase an overall read-out rate. Advantageously, an increase in the read-out rate would minimise an amount of missed photon-strike events.

The circuitry may comprise a control loop configured to adapt, based upon one more measurements of the intensity of incident radiation, a read-out rate and a corresponding amount of SPADs to be read-out for one or more subsequent intensity measurements.

Advantageously, the provision of a control loop enables the radiation-sensitive device to dynamically adapt to varying conditions. For example, as an intensity of incident radiation increases, the device may adapt an amount of SPADs used and/or a read-out rate accordingly, to ensure accurate measurements of the intensity of the incident radiation can be made with sufficient signal-to-noise ratio. As such, by setting the one or more thresholds at a start-up period, a system comprising the radiation-sensitive device subsequently operate with a degree of autonomy, dynamically adapting the read-out rate and the corresponding amount of SPADs in response to varying levels of intensity of incident radiation.

According to a second aspect of the disclosure, there is provided a method of increasing a dynamic range of a radiation-sensitive device comprising a plurality of SPADs, the method comprising adapting a read-out rate of the plurality of SPADs in relation to an intensity of incident radiation.

Advantageously, by adapting a read-out rate, an amount of time a SPAD has available to detect a photon strike may be adapted accordingly. By adapting the read out rate in relation to the intensity of the incident radiation, an amount of SPADs that are not recording photon-strikes events may be minimised, and hence a dynamic range of the radiation-sensitive device may be increased, while maintaining an adequate signal-to-noise ratio.

The method may comprise adapting an amount of SPADs of the plurality of SPADs that are read-out in relation to the intensity of incident radiation.

The method may comprise reading out a low amount of SPADs when the intensity of incident radiation is high, and reading-out a relatively high amount of SPADs when the intensity of incident radiation is relatively low.

According to a third aspect of the disclosure, there is provided a use of a radiation-sensitive device according to the first aspect in a point-of-care testing or diagnostics application, or an electronic-nose application, to determine an intensity of luminescence and/or fluorescence from a specimen.

Detection of radiation emission with a very large dynamic range is particularly required in such point-of-care testing or diagnostics applications, or electronic-nose applications, because the levels of the chemi-luminescent or fluorescent radiation emitted by interaction between biological or chemical substances and complementary substances may vary dynamically between extreme low and high levels.

According to a fourth aspect of the disclosure, there is provided an electronic-nose or point-of-care apparatus comprising a radiation-sensitive device according to the first aspect, wherein the radiation-sensitive device is configured to determine an intensity of luminescence and/or fluorescence from a specimen.

According to a fourth aspect of the disclosure, there is provided a method of use of a radiation-sensitive device according to the first aspect in an ambient radiation sensing application.

The radiation-sensitive device may be implemented in an imaging device such as a camera, e.g. a camera on a smartphone, for determining an ambient radiation level. The determined ambient radiation level may be used to adapt an image captured by the imaging device. The determined ambient radiation level may be used to configure the imaging device, such as to control operation of an aperture, a flash, or the like.

The radiation-sensitive device may be for determining an ambient radiation level for adjusting a brightness of a screen or display.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE DRAWINGS

These and other aspects of the present disclosure will now be described, by way of example only, with reference to the accompanying drawings, wherein.

DETAILED DESCRIPTION OF THE PREFERRED EMBODIMENTS

It has been recognised that in some applications, to increase a signal-to-noise ratio (SNR) in SPAD-based devices, e.g. to accurately detect very low light levels, it may be beneficial to implement a substantial quantity of SPADs. That is, such devices may implement SPAD-arrays comprising, hundreds or even thousands of SPADs in order to accurately measure an intensity of incident radiation with sufficient SNR.

However, a maximum radiation intensity that can be measured by a given SPAD array may be determined by its saturation level.

Saturation may occur when a photon rate reaches a limit of the rate at which SPAD device itself can perform detection. For example, the fastest rate at which a SPAD-based device can count photon-strike events is determined by a time between a photon-strike event and a recovery time of the SPAD. The recovery time is a time required for a given SPAD to recover and be ready again. This is known in the art as the 'dead time'. Depending on the particular quenching circuitry implemented, this recovery time may be in the region of a few 10's of nanoseconds, or longer. For example, for a dead time of 100 nanoseconds, a maximum theoretical photon count per SPAD would be $10^7$ per second.

Saturation may additionally or alternatively occur when circuitry associated with the SPADs, e.g. reading and counting circuitry attached to each SPAD, reaches a limit.

In some examples, every single SPAD has a dedicated readout bandwidth for registering photon-strike events. This leads to a physical limitation on the maximum measurable signal for a given architecture.

For example, in some examples, every SPAD has only a single latch to store a photon-strike event, e.g. a single-bit counter. This latch may be reset every time it is read. A minimum read-out interval is a time required to read out all of such latches.

Figure 1:
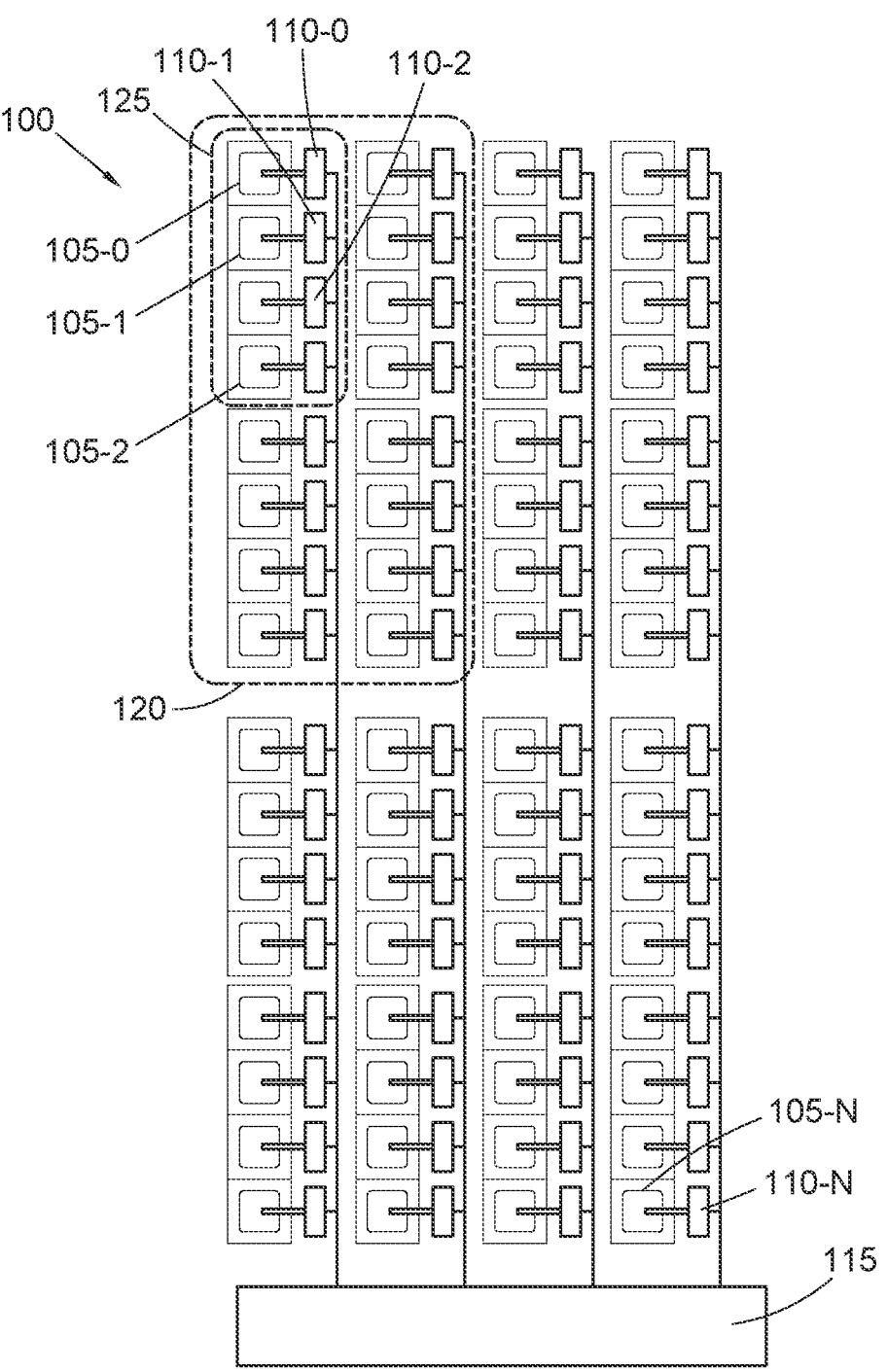
FIG. 1 depicts a SPAD-based sensor architecture according to an embodiment of the disclosure.

FIG. 1 depicts an example of a SPAD-based sensor architecture 100 comprising SPADs and associated single-bit counters, according to an embodiment of the invention. The SPAD-based sensor architecture 100 of FIG. 1 provides an example of the disclosure, namely determining an intensity of incident radiation, using a radiation-sensitive device comprising a plurality of SPADs, wherein circuitry is configured to adapt a read-out rate of the plurality of SPADs in relation to an intensity of incident radiation.

It will be appreciated that FIG. 1 is an example embodiment only, and is provided for purposes of explaining the principles of the disclosure. For example, other embodiments may comprises substantially larger arrays of SPADs and associated single-bit counters. For example, some embodiments may comprise arrays having hundreds or even thousands of SPADs. Furthermore, example devices embodying the disclosure, such as sensors suitable for use in PoC or E-nose applications, may comprise multiple arrays of SPADs.

The SPAD-based sensor architecture 100 of FIG. 1 comprises a plurality of SPADs 105-0 to 105-N. Each SPAD of FIG. 1 has an associated single-bit counter 110-0 to 110-N. In some embodiments, the single bit-counters 110-0 to 110-N may be implemented using latches, switches, or the like.

The single-bit counters 110-0 to 110-N may be coupled to processing circuitry 115.

Such processing circuitry 115 may be configured to determine an intensity of incident radiation using at least one of the plurality SPADs 105-0 to 105-N, wherein a read-out rate of the plurality of SPADs 105-0 to 105-N may be adapted in relation to an intensity of incident radiation.

Embodiments of the disclosure are based on the following principle: when multiple SPADs are used together to measure light intensity, a (statistical) signal-to-noise ratio is proportional to the square root of the following two parameters: (1) the number of SPADs used in the measurement and (2) the time-window over which the measurement is taken.

As such, embodiments of the disclosure effectively trade off SNR, which is overabundant at high radiation levels, for dynamic range, as described below in more detail. It has been recognised that as an intensity of radiation being measured, i.e. a signal level, increases, the size of the time-window over which the measurement must be taken reduces.

Regarding the SPAD-based sensor architecture 100 of FIG. 1, since every SPAD 105-0 to 105-N has only a single-bit counter 110-0 to 110-N to store a photon-strike event, this single-bit counter needs to be reset every time it is read to avoid missing further photon-strike events. The read-out interval is the time required to read all of the single-bit counters 110-0 to 110-N.

'Num$_{Sp}$' denotes a number of SPADs 105-0 to 105-N required to achieve a required SNR at the minimum radiation intensity. The time required to read-out and reset each single-bit counter 110-0 to 110-N may be denoted by "T$_{1\_SPAD}$. Given the time required to read-out and reset each single-bit counter 110-0 to 110-N, the total readout time is Num$_{SP}$×T$_{1\_SPAD}$.

Since each SPAD 105-0 to 105-N can only record one event between each readout cycle, a maximum number of photons that can be read per second per SPAD 105-0 to 105-N can be defined as:

$$SPAD_{MAX(PHOTON/SEC)} = \frac{1}{\left(Num_{SP} \times T_{ISPAD}\right)} - DCR \qquad \text{Equation (1)}$$

wherein:

SPAD$_{MAX(PHOTON/SEC)}$ corresponds to a number of photons can be read per second per SPAD 105-0 to 105-N;

Num$_{SP}$ is the number of SPADs required to achieve a required SNR at the minimum radiation intensity;

T$_{1\_SPAD}$ is the time required to read-out and reset each single-bit counter 110-0 to 110-N; and DCR is a dark count rate.

Once the intensity of incident radiation increases such that more than one photon arrives per SPAD 105-0 to 105-N in the read-out cycle, recording of photon-strike events may be missed.

In embodiments of the invention, processing circuitry 115 may be configured to detect whether an intensity of incident radiation has increased significantly above a minimum value for which all SPADS 105-0 to 105-N are required to achieve the necessary SNR. For example, in some embodiments, the processing circuitry may implement a control system and/or a control loop.

For example, the processing circuitry 115 may be configured to determine, based upon a quantity of the single-bit counters 110-0 to 110-N that are set during one or more read-out intervals, an intensity of the incident radiation. If it is determined by the processing circuitry 115 that the intensity of incident radiation is above a minimum level, then an amount of SPADs 105-0 to 105-N that can be read out in the time interval can be adapted, and hence the read-out rate of the SPADs 105-0 to 105-N can be adapted accordingly.

For example, if the intensity of incident radiation is a factor of two above threshold defined by a minimum level required to meet the SNR, the processing circuitry 115 may be configured to start reading-out only one in four of the SPADs 105-0 to 105-N during each time interval. That is, when the radiation intensity level has doubled, it may be sufficient to have the data from a number of SPADs equal to Num$_{SP}$/2$^2$.

As such, the read-out time may be reduced by a factor of four, i.e. the read-out rate may be increased. Therefore, a maximum radiation level that can be read-is also increased by a factor of four.

In some embodiments, the processing circuitry may be configured to implement multiple such thresholds to reduce or increase a number of SPADS and an associated read-out rate accordingly, as described in more detail below with reference to FIG. 1.

The example embodiment of FIG. 1 represents a SPAD-based sensor architecture 100 that has been designed such that a number of SPADs 105-0 to 105-N used to measure a radiation intensity decreases with logarithmic relationship to the magnitude of the radiation level itself. For purposes of example only, this is shown as an array comprising 64-SPADs 105-0 to 105-N, each with an associated single-bit counter 110-0 to 110-N, e.g. a latch. It will be appreciated that in other embodiments, larger or smaller arrays of SPADs 105-0 to 105-N may be implemented. That is, in the example of FIG. 1, "Num$_{SP}$", e.g. the total number of SPADs 105-N required by the SPAD-based sensor architecture 100 to achieve the required SNR is 64. The time T$_{1\_SPAD}$ required to read-out and reset each single-bit counter will be assumed to be 100 ns.

For purposes of example, a use-case commencing with a low-intensity of incident radiation will be described. By default the processing circuitry may be configured to read out all of the SPADs 105-0 to 105-N at a first read-out rate, as defined by equation 1. The read-out interval, which is the time required to read all of the single-bit counters, would be 64×100 ns=6.4 us. A SPAD 105-N would therefore be read out at a maximum rate of 156250 times per second.

If the intensity of incident radiation increases to above a predetermined threshold, then an amount of SPADs 105-N that are read out may be reduced and a corresponding read-out rate may be increased. For example, the predetermined threshold, which may in some embodiments be programmed by a user, may correspond to an amount of SPADs 105-N that detect a photon-strike event within a given read-out interval. The predetermined threshold may correspond to an amount of SPADs 105-N that detect a photon-strike event from a plurality of read-out intervals, using a process of averaging, extrapolation and/or interpolation. That is, in some embodiments, an intensity of incident radiation may be determined by one or more cycles of reading-out the SPADs 105-N, or an active subset of the SPADs, as described below in more detail.

Processing circuitry 115 which is configured to read and reset each single-bit counter 110-0 to 110-N may determine that such a threshold has been met or exceeded. The processing circuitry 115 may then select a first subset 120 of the SPADs 105-0 to 105-N for a subsequent measurement of the intensity of the incident radiation. In some embodiments, the first subset 120 may correspond to one fourth of the SPADs 105-0 to 105-N used for measuring the incident radiation when the intensity was determined to be below the threshold.

That is, in some embodiments processing circuitry 115 may comprise a control loop configured to adapt, based upon one more measurements of the intensity of incident radiation, a read-out rate and an associated corresponding amount of SPADs to be read out for one or more subsequent intensity measurements.

Although FIG. 1 depicts a first subset 120 comprising adjacent SPADs, it will be understood that this is for purposes of example only, and that in other embodiments the SPADs forming the first subset 120, or indeed any of the subset 120, 125, may not necessarily be adjacent one another. That is, in some embodiments the SPADs 105-0 to 105-N selected to form a subset 120, 125 may be interspersed or otherwise grouped within an array.

With only one fourth of the SPADS required to measure the intensity of the incident radiation with the required SNR, the read-out interval would become 16×100 ns=1.6 us. That is, the read-out interval has also reduced by a factor of four, and thus a read-out rate has increased by a factor of four to 1/1.6 us=625000 times per second. The increased read-out rate directly increases a maximum intensity of incident radiation that can be measured, thereby increasing a dynamic range of the SPAD-based sensor architecture 100.

Continuing with the example of FIG. 1, if the intensity of incident radiation increases to above a second predetermined threshold, then an amount of the SPADs 105-0 to 105-N that are read out may be further reduced and a corresponding read-out rate may be further increased. The second threshold, and indeed any of a plurality of thresholds that may be implemented, may in some embodiments be programmed by a user.

Processing circuitry 115 which is configured to read and reset each single-bit counter 110-0 to 110-N may determine that such a second threshold has been met or exceeded. The processing circuitry 115 may then select a second subset 125 of the SPADs for a subsequent measurement of the intensity of the incident radiation. In some embodiments, the second subset 125 may correspond to one fourth of the SPADs used in the first subset 120. That is, the second subset 125 may, in some embodiments, be formed from a subset of the first subset 120 of SPADs 105-0 to 105-N.

With only one fourth of the previous amount of SPADS required to measure the intensity of the incident radiation with the required SNR, e.g. one sixteenth of the total amount of SPADs, the read-out interval would become 4×100 ns=0.4 us. That is, the read-out interval has also reduced by a further factor of four, and thus a read-out rate has increased by a further factor of four to 1/0.4 us=2,500,000 times per second. The further increase in the read-out rate directly increases a maximum intensity of incident radiation that can be measured, thereby increasing a dynamic range of the SPAD-based sensor architecture 100.

As such, a relatively low amount of SPADs, e.g. subset 125 may be read-out to determine the intensity of the incident radiation when the intensity is high, and a relatively high amount of SPADs e.g. subset 120 or all of the SPADs 105-0 to 105-N, may be read-out to determine the intensity of the incident radiation when the intensity is relatively low.

Figure 2:
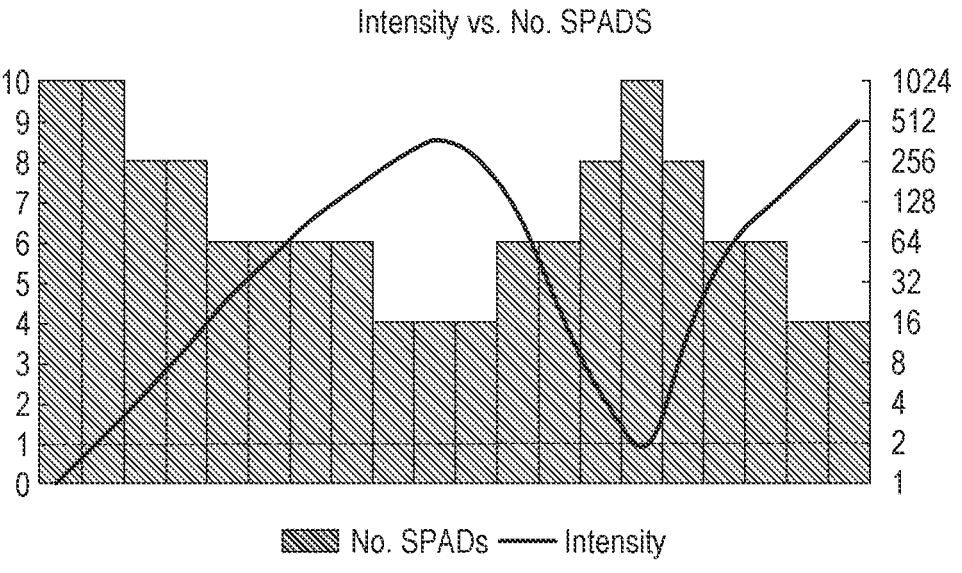
FIG. 2 is a graph showing an amount of SPADs required as a function of an intensity of incident radiation, according to an embodiment of the invention.
Figure 3:
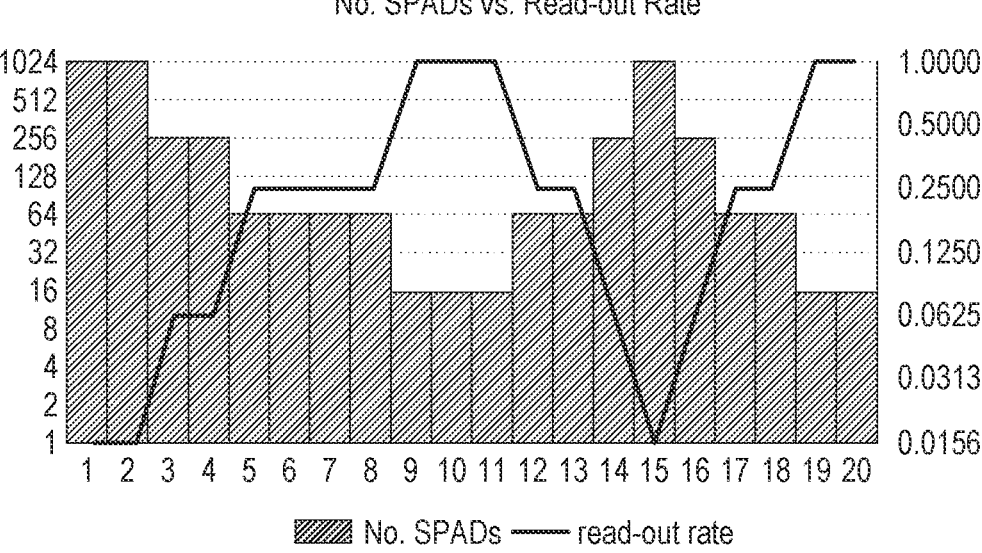
FIG. 3 is a graph showing an amount of SPADs required relative to an associated read-out rate of the SPADs, according to an embodiment of the invention.

This principle of operation is depicted in the graph of FIGS. 2 and 3. FIG. 2 shows an amount of SPADs that may be used to measure incident radiation relative to an intensity of the incident radiation. For purposes of example only, the intensity of incident radiation has been scaled such that a value of '1' represents a minimum value for which all SPADS are required to achieve the necessary SNR.

In this example, it can be seen that 1024 SPADs are required to measure the intensity of incident radiation with the necessary SNR.

The x-axis of the chart represents time. As the intensity of incident radiation increases over time, a first threshold corresponding to a factor of two increase in the intensity of incident radiation is reached. At this stage, the processing circuitry of a device embodying the invention would determine that the threshold has been met or exceeded, and an amount of SPADs used for a subsequent measurement would be decreased by a factor of four to 256. Corresponding FIG. 3, which shows a normalized read-out rate as a function of the number of SPADs used for a measurement, shows that the read-out rate is also increased by a factor of four as the threshold is exceeded. That is, as the number of SPADs used decreases from 1024 to 256, the readout rate increases by a factor of four from 0.0156 to 0.625. It will be noted that the read-out rate has been scaled such that the maximum is '1' for purposes of example, and an actual read-out rate would depend upon a time required to read-out and reset a latch associated with each SPAD, e.g. "$T_{1\_SPAD}$" as described above.

FIGS. 2 and 3 further depict how, as an intensity of incident radiation increases and decreases, a number of SPADs and therefore an associated read-out rate may be adapted accordingly. That is, a read-out rate of a plurality of SPADs may be adapted in relation to an intensity of incident radiation.

Figure 4:
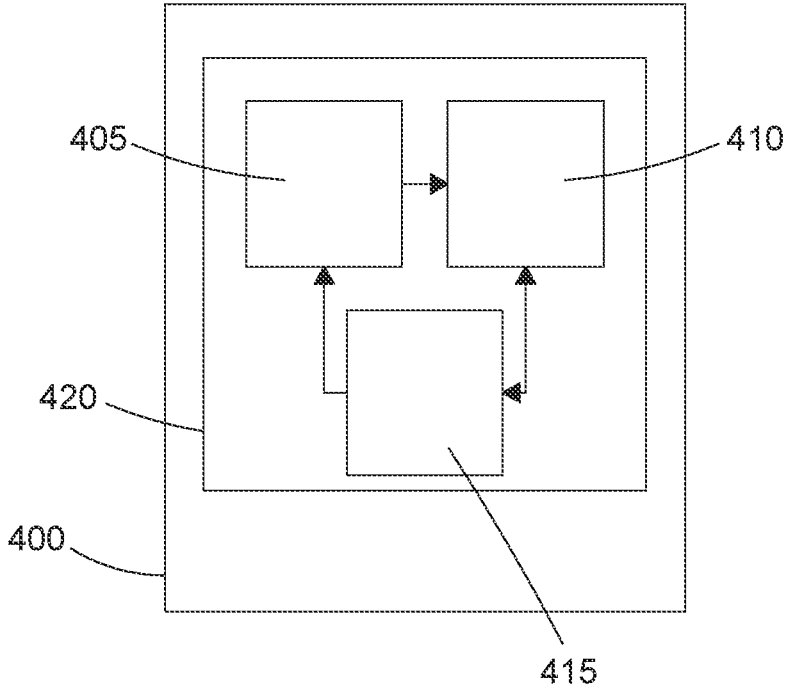
FIG. 4 depicts a radiation-sensitive device according to an embodiment of the invention.

FIG. 4 depicts an apparatus 400 comprising a radiation-sensitive device 420 according to an embodiment of the invention. In some example embodiments, the apparatus 400 may be an apparatus for a Point of Care (PoC) testing or Electronic-Nose (E-nose) type of application, or an ambient radiation sensor application.

The radiation-sensitive device 420 comprises a plurality of SPADs 405. The plurality of SPADs 405 may be arranged as one or more arrays of SPADs 405.

The radiation-sensitive device 420 also comprises a plurality of single-bit counters 410, e.g. latches. Each single-bit counter of the plurality of single-bit counters 410 is associated with a SPAD of the plurality of SPADs 405, as described above with reference to FIG. 1. The SPADs 405 and the associated single-bit counters 410 may be arranged in accordance with SPAD-based sensor architecture 100 of FIG. 1.

The radiation-sensitive device 420 also comprises processing circuitry 415. In some embodiments, the processing circuitry 415 may be configured to control the plurality of SPADs 405. For example, in some embodiments the processing circuitry 415 may be configured to control quenching of the SPADs 405, and or reset or enabling of one or more of the SPADs 405. The processing circuitry 415 may also be configured to detect one or more faulty SPADs 405.

In some embodiments, the processing circuitry 415 may be configured to read the single-bit counters 410. In some embodiments, the processing circuitry 415 may also be configured to reset the single-bit counters 410 as required. The processing circuitry 415 may comprise at least one of: a CPU, a microcontroller, a state machine, combinatorial logic, or the like.

In some embodiments, the processing circuitry 415 may be configured to determine an intensity of incident radiation using at least one of the plurality SPADs 405, wherein a read-out rate of the plurality of SPADs is adapted in relation to an intensity of incident radiation.

In some embodiments, an aperture, a lens, an optical cover, a grating or one or more other optical devices may be disposed between the SPADs 405 and a source of radiation. Such devices may, for example, be configured to focus and/or diffuse radiation incident upon the SPADs 405. In some embodiments, one or more apertures may be stacked to form a stack of shifted apertures, or pin-holes. Such a stack may be disposed on or in close proximity to the SPADs 405. In such embodiments, at least some of the SPADs 405 may be subjected to a lower intensity of incident radiation than other SPADs of the radiation-sensitive device 420. By using such shifted apertures, in combination with any of the above-described techniques, a dynamic range of the radiation-sensitive device 420 may be further increased.

Although the disclosure has been described in terms of particular embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A radiation-sensitive device comprising:
a plurality of single photon avalanche diodes (SPADs); and
circuitry configured to determine an intensity of incident ambient radiation by one or more cycles of reading-out a subset of the plurality of SPADs that is less than all the plurality of SPADS and configured to adapt a read-out rate of one or more of the plurality of SPADs in relation to the intensity of the incident ambient radiation that is incident on the plurality of SPADs by selecting a minimum of the one or more of the plurality of SPADS that is less than all the plurality of SPADS from which outputs are processed based on the intensity of the incident ambient radiation that maintains a predetermined signal-to-noise ratio and to configure a control operation of an imaging device based on the intensity of the incident ambient radiation that is determined.

2. The radiation-sensitive device of claim 1, wherein the circuitry is configured to:
increase the read-out rate in response to the intensity of incident ambient radiation exceeding a threshold;
decrease the read-out rate in response to the intensity of incident ambient radiation intensity at or below the threshold.

3. The radiation-sensitive device of claim 2, wherein the threshold is programmable.

4. The radiation-sensitive device of claim 1, wherein a first amount of SPADs are read-out to determine the intensity of the incident ambient radiation when the intensity is high, and a second amount of SPADs are read-out to determine the intensity of the incident ambient radiation when the intensity is low, wherein the first amount is lower than the second amount.

5. The radiation-sensitive device of claim 1, wherein each SPAD of the plurality of SPADs has an associated single-bit counter for registering photon strikes.

6. The radiation-sensitive device of claim 5 wherein, a maximum number of photons that are read per second per SPAD is defined as:

$$SPAD_{MAX(PHOTON/SEC)} = \frac{1}{\left(Num_{SP} \times T_{1_{SPAD}}\right)} - DCR$$

wherein:
$SPAD_{MAX(PHOTON/SEC)}$ corresponds to the number of photons that are read per second per SPAD;
$Num_{SP}$ is the number of SPADs required to achieve a required SNR at a minimum radiation intensity;

$T_{1\_SPAD}$ is a time required to read-out and reset each single-bit counter (110-0 . . . N); and
DCR is a dark count rate.

7. The radiation-sensitive device of claim 5, wherein the single-bit counter comprises a latch or a switch.

8. The radiation-sensitive device of claim 1, wherein the read-out rate is dependent upon an amount of SPADs that are to be read-out.

9. The radiation-sensitive device of claim 1 wherein the circuitry comprises a control loop configured to adapt, based upon one more measurements of the intensity of incident ambient radiation, a read-out rate and a corresponding amount of SPADs to be read-out for one or more subsequent intensity measurements.

10. Use of a radiation-sensitive device according to claim 1 in a point-of-care testing or diagnostics application, or an electronic-nose application, to determine an intensity of luminescence and/or fluorescence from a specimen.

11. An electronic-nose or point-of-care apparatus comprising a radiation-sensitive device according to claim 1, wherein the radiation-sensitive device is configured to determine an intensity of luminescence and/or fluorescence from a specimen.

12. Use of a radiation-sensitive device according to claim 1 in an ambient radiation sensing application.

13. The radiation-sensitive device of claim 1, wherein the control operation comprises a flash parameter, an aperture parameter, a level of brightness of a screen or display.

14. A method of increasing a dynamic range of a radiation-sensitive device comprising a plurality of single photon avalanche diodes (SPADs), the method comprising:
receiving incident ambient light on one or more of the plurality of SPADs;
determining, using electronic circuitry, an intensity of incident ambient radiation by one or more cycles of reading-out a subset of the plurality of SPADs that is less than all the plurality of SPADS;
adapting, using the electronic circuitry, a read-out rate of the one or more of the plurality of SPADs in relation to the intensity of incident ambient radiation that is incident on the plurality of SPADs by selecting a minimum of the one or more of the plurality of SPADS that is less than all the plurality of SPADS from which outputs are processed based on the intensity of the incident ambient radiation that maintains a predetermined signal-to-noise ratio; and
configuring a control operation of an imaging device based on the intensity of the incident ambient radiation that is determined.

15. The method of claim 14, comprising reading out a first amount of SPADs when the intensity of incident ambient radiation is high, and reading-out a second amount of SPADs when the intensity of incident ambient radiation is low, wherein the first amount is lower than the second amount.

* * * * *